United States Patent
Hatfield et al.

(10) Patent No.: US 11,726,523 B1
(45) Date of Patent: Aug. 15, 2023

(54) HEAD-MOUNTABLE DEVICE WITH VARIABLE STIFFNESS HEAD SECUREMENT

(71) Applicant: Apple Inc., Cupertino, CA (US)

(72) Inventors: Dustin A. Hatfield, Campbell, CA (US); Geng Luo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 17/397,819

(22) Filed: Aug. 9, 2021

Related U.S. Application Data

(60) Provisional application No. 63/083,771, filed on Sep. 25, 2020.

(51) Int. Cl.
| | |
|---|---|
| H04R 1/02 | (2006.01) |
| G06F 1/16 | (2006.01) |
| H04R 1/10 | (2006.01) |
| H04R 5/02 | (2006.01) |
| H04N 23/57 | (2023.01) |

(52) U.S. Cl.
CPC .............. *G06F 1/163* (2013.01); *H04R 1/10* (2013.01); *H04N 23/57* (2023.01)

(58) Field of Classification Search
CPC ........ H04N 5/2257; H04N 23/57; H04R 1/10; G06F 1/163
USPC .......................................... 381/381, 333, 306
See application file for complete search history.

(56) References Cited

U.S. PATENT DOCUMENTS

| | | | |
|---|---|---|---|
| 8,643,568 B2 | 2/2014 | West et al. | |
| 9,703,103 B2 | 7/2017 | Araki et al. | |
| 10,251,292 B2 | 4/2019 | Araki et al. | |
| 2022/0035317 A1* | 2/2022 | Porter | G04G 21/08 |

* cited by examiner

*Primary Examiner* — Ammar T Hamid
(74) *Attorney, Agent, or Firm* — BakerHostetler

(57) ABSTRACT

A head-mountable device can include a head securement element that provides limited flexibility while also providing adequate stiffness to reduce the effects of sagging components under their own weight. Such stiffness can help the forces be distributed evenly across the face. For example, rather than allowing excessive forces to weigh on the cheeks and/or nose of the user, certain types of stiffness about the head-mountable device can help distribute forces along the forehead of the user and/or other regions.

20 Claims, 4 Drawing Sheets

HEAD-MOUNTABLE DEVICE WITH VARIABLE STIFFNESS HEAD SECUREMENT

CROSS-REFERENCE TO RELATED APPLICATION

This application claims the benefit of U.S. Provisional Application No. 63/083,771, entitled "HEAD-MOUNTABLE DEVICE with VARIABLE stiffness HEAD SECUREMENT," filed Sep. 5, 2020, the entirety of which is incorporated herein by reference.

TECHNICAL FIELD

The present description relates generally to head-mountable devices, and, more particularly, to head securement mechanisms for securing a head-mountable devices to a head of a user.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

A head-mountable device can be secured to a head of a user while being worn and operated by the user. It can be desirable to maximize the fit and comfort on the user, so that usage of the head-mountable device for extended durations is not difficult for the user.

Some head-mountable devices are designed to secure to the head of the user by wrapping tightly around the back of the user's head, for example, with a band. This arrangement often involves providing a tightness that can secure the head-mountable device to a variety of head shapes and sizes. However, this can be somewhat uncomfortable for at least some users. The forces can be unevenly distributed about the face as the forces of gravity pull components onto certain facial regions.

To maximize comfort experienced by the user, a head-mountable device can include a head securement element that provides limited flexibility while also providing adequate stiffness to reduce the effects of sagging components under their own weight. Such stiffness can help the forces be distributed evenly across the face. For example, rather than allowing excessive forces to weigh on the cheeks and/or nose of the user, certain types of stiffness about the head-mountable device can help distribute forces along the forehead of the user and/or other regions.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
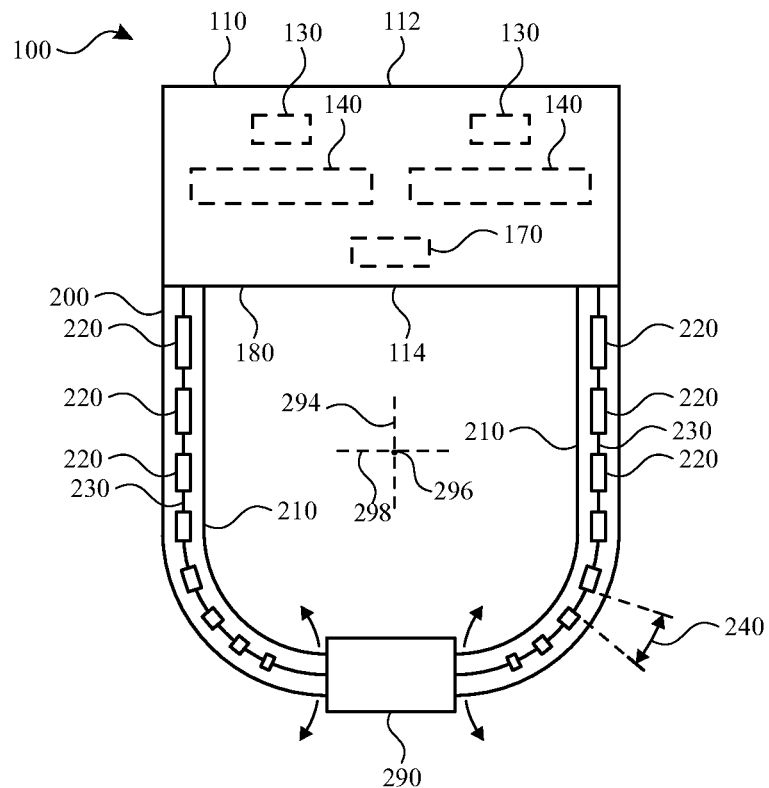
FIG. 1 illustrates a top view of a head-mountable device, according to some embodiments of the present disclosure.

As shown in FIG. 1, a head-mountable device 100 can include a frame 110 and a head securement element 200. The head-mountable device 100 can be worn on a head of a user. The frame 110 can be positioned in front of the eyes of a user to provide information within a field of view of the user. The frame 110 and/or other face engaging components can provide a nosepiece to rest on a user's nose.

The frame 110 can provide structure around a peripheral region thereof to support any internal components of the head-mountable device 100 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can optionally be positioned within the head securement element 200 of the head-mountable device 100.

The frame 110 can include and/or support one or more camera modules 130. The camera modules 130 can be positioned on or near an outer side 112 of the frame 110 to capture images of views external to the head-mountable device 100. As used herein, an outer side of a portion of a head-mountable device 100 is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 100 can include display elements 140 that provide visual output for viewing by a user wearing the head-mountable device 100. One or more display elements 140 can be positioned on or near an inner side 114 of the frame 110. As used herein, an inner side 114 of a portion of a head-mountable device 100 is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set and/or changed based on an interpupillary distance ("IPD") of the user. IPD is defined as the distance between the centers of the pupils of a user's eyes.

The frame 110 can include a sensor 170. The sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like.

The inner side 114 of the frame 110 can define an interior space through which light can pass, thereby providing to the user wearing the head-mountable device a view of a display element of the frame 110. Such a view can be enhanced by preventing the ingress of light from the external environment and into the face engagement module 180. To provide an effective face engagement, a comfortable fit, and proper alignment of the frame 110, the inner side 114 can be modular and customized and/or selected for a particular user. As such, a given frame 110 can be used with various users where each user is provided with an appropriate face-engaging inner side 114 that provides the desired fit.

While the inner side 114 is shown schematically with a particular size and shape, it will be understood that the size and shape of the inner side 114 can have a size and shape that accommodates the face of a user wearing the head-mountable device 100. For example, the inner side 114 can provide a shape that generally matches the contours of the user's face around the eyes of the user. The inner side 114 can be provided with one or more features that allow the inner side 114 to conform to the face of the user to enhance comfort and block light from entering the frame 110 at the point of contact with the face. For example, the inner side 214 can provide a flexible, soft, elastic, and/or compliant structure.

The head securement element 200 can further include a band for extending to and/or about a rear side of the head of the user, as described further herein. The band can optionally extend from ends of the arms 190. The band can be stretchable to comfortably provide tension about the head of the user. For example, the band can include fabric, elastic, polymers, woven materials, braided materials, and the like. It will be understood that the head securement element 200 can optionally be coupled to the frame 110 by arms or other extensions that are rigidly coupled to the frame 110 and/or integrally connected thereto.

The frame 110 can be supported on a user's head with a head securement element 200. The head securement element 200 can wrap or extend along opposing sides of a user's head and/or to a rear of the user's head. The head securement element 200 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100.

As further shown in FIG. 1, the head securement element 200 can include multiple components 220 that are connected to each other by a tether 230. Each of the components 220 can be contained within a band sheath 210, which can optionally enclose the components 220 and hide them from view.

The components 220 can move and/or pivot relative to each other within a range of motion that can be limited in different ways and in different dimensions. For example, each of the components 220 can be substantially rigid, such that they experienced minimal bending and flexing within each his own structure. However, the components 220 can pivot relative to each other as facilitated by the tether 230. By further example, the components 220 can pivot relative to each other within a range of horizontal deflection 240. As used herein, a range of horizontal deflection is a range within which any adjacent pairs of components 220 can pivot with respect to each other to modify an angle formed there between and within a horizontal plane (e.g., a plane extending through the frame 110 and the head securement element 200). A range of horizontal deflection can define the range of curvature available as the head securement element 200 deflects away from the frame 110 and toward a Y-axis 294 (e.g., sagittal axis of the user) and/or extends about a Z-axis 296 (e.g., vertical axis of the user) extending through a central region of the head-mountable device 100 (e.g., within a region occupied by the user when the head-mountable device is worn). Accordingly, the head securement element 200 can bend horizontally to substantially conform to the head of the user as it wraps around the sides and back of the head.

The head securement element 200 can further include an adjustment element 290 for adjusting a tightness and/or fit of the head securement element 200. The adjustment element 290 can, for example, be operated to alter an effective length of the head securement element 200 and/or a distance between the ends thereof (e.g., connected to the frame 110). The adjustment element 290 can be operated manually by a user and/or by a controller of the head-mountable device 100 (e.g., in the frame 110). Operation of the adjustment element 290 can alter the tightness of the band sheath 210 and/or the components 220, as described further herein.

Figure 2:
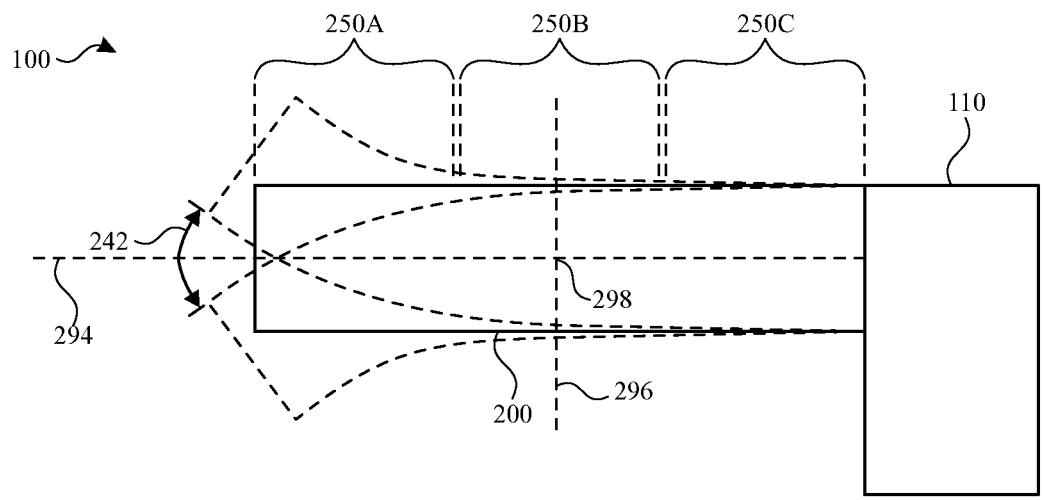
FIG. 2 illustrates a side view of the head-mountable device of FIG. 1, according to some embodiments of the present disclosure.

FIG. 2 illustrates a side view of the head-mountable device of FIG. 1, according to some embodiments of the present disclosure. As shown in FIG. 2, the head securement element can deflect in another axis, with variable limitations on the extent of available deflection at different sections thereof. For example, the head securement element 200 can include a rear section 250A (e.g., a first section), a middle section 250B (e.g., a second section), and a front section 250C (e.g., a third section). It will be understood that any number of sections can be defined, with each section having one or more characteristics that are distinct with respect to at least one other section.

The components of each section can pivot relative to each other within a range of vertical deflection 242. As used herein, a range of horizontal deflection is a range within which any adjacent pairs of components can pivot with respect to each other to modify an angle formed there between and within a vertical plane (e.g., a plane orthogonal to a horizontal plane). A range of vertical deflection can define the range of curvature available as the head securement element 200 deflects away from the horizontal plane (i.e., defined by the X-axis 298 and the Y-axis 294) and/or extends about the X-axis 298 (e.g., frontal axis of the user).

Accordingly, the head securement element 200 can bend vertically to secure to upper or lower regions on the back of the head of the user. At the same time, one or more sections closer to the frame 110 (e.g., the front section 250C) can provide more stiffness in this dimension and less bendability so that the tilt of the frame 110 on the face of the user is less subject to forces of gravity. For example, instead of letting the frame 110 freely tilt downward to apply excessive weight on the cheeks and/or nose of the user, the stiffness of the head securement element 200 that limits the range of vertical deflection adjacent to the frame 110 can help maintain the frame 110 at a more elevated position and orientation to move evenly distribute forces along the forehead of the user and/or other regions.

Such performance characteristics can be provided by various combinations of features in a head securement element. The examples that follow can provide such features. It will be understood that various features can provide the same performance characteristics, and features from different examples can be combined to achieve a given performance characteristic.

Figure 3:
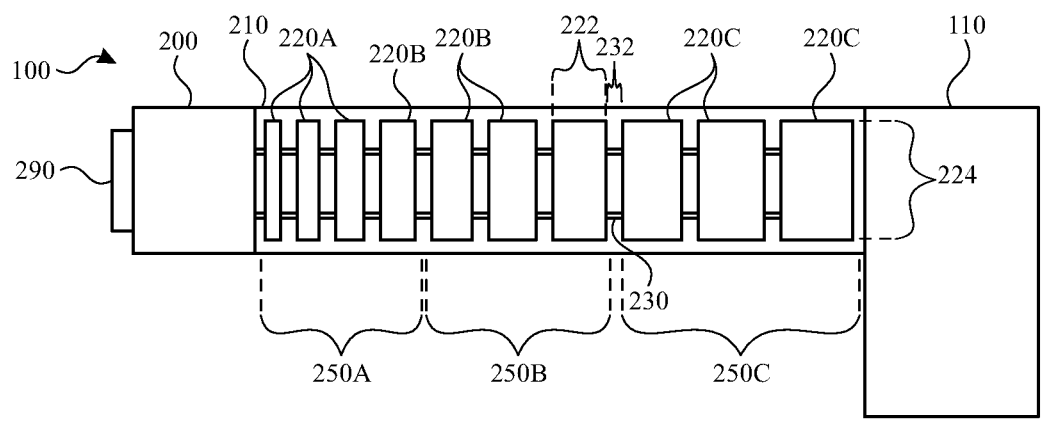
FIG. 3 illustrates a side view of a head-mountable device, according to some embodiments of the present disclosure.

Referring now to FIG. 3, a head securement element of a head-mountable device can include multiple components having different sizes. As shown in FIG. 3, the head securement element 200 can include a rear section 250A (e.g., a first section) with rear components 220A, a middle section 250B (e.g., a second section) with middle components 220B, and a front section 250C (e.g., a third section) with front components 220C. Each of the components can have particular features, such a shape defining at least a length 222 (e.g., measured along or parallel to a longitudinal or horizontal length of the head securement element) and a height (e.g., measured along or parallel to a vertical height of the head securement element).

Each of the rear components 220A of the rear section 250A can have a length that is shorter than a length of each of the middle components 220B of the middle section 250B, which can in turn be shorter than a length of each of the front components 220C of the front section 250C. By providing relatively greater lengths to the components in the front section(s), fewer articulation points between components are provided along a given length.

Additionally or alternatively, each of the components can be separated from its adjacent components by a corresponding gap length 232. Adjacent pairs of the rear components 220A of the rear section 250A can be separated a gap length that is longer than a gap length separating each of the middle components 220B of the middle section 250B, which can in turn be longer than a gap length separating each of the front components 220C of the front section 250C. By providing relatively shorter gap lengths to the components in the front section(s), the existing articulation points are limited to a small range of vertical deflection before the components contact each other, thereby limiting further articulation.

Figure 4:
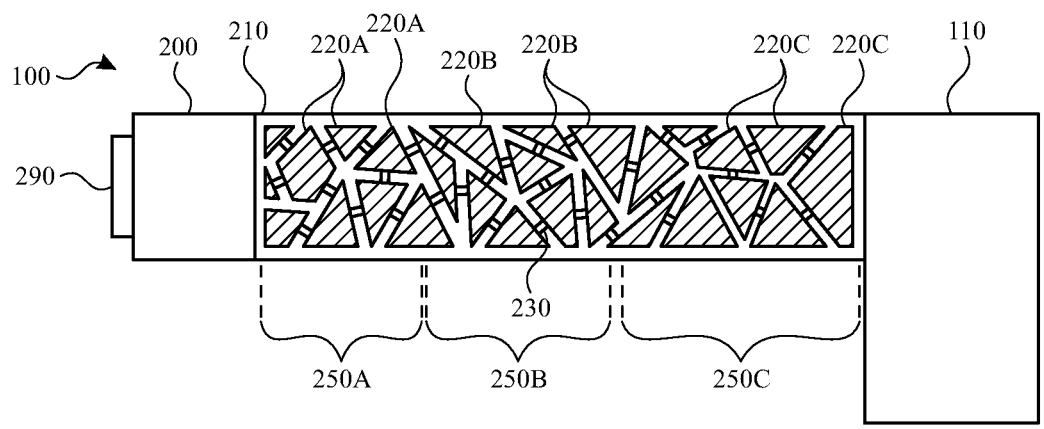
FIG. 4 illustrates a side view of a head-mountable device, according to some embodiments of the present disclosure.

Referring now to FIG. 4, a head securement element of a head-mountable device can include multiple components having different shapes. As shown in FIG. 4, the head securement element 200 can include a rear section 250A (e.g., a first section) with rear components 220A, a middle section 250B (e.g., a second section) with middle components 220B, and a front section 250C (e.g., a third section) with front components 220C. Each of the components can have a shape that is different than the shape of at least one other component. It will be understood that components can have the same shape with different sizes. It will be understood that components can have the same size with different shapes. The variation in shapes can provide for different sizes for components, different directions of articulation between coupled components, different gap lengths, different densities of components, different distribution of components, and the like.

As further shown in FIG. 4, each component can be directly connected by the tethers 230 to one or more other components. The rear components 220A of the rear section 250A can have an average and/or total number of connections that is greater than an average and/or total number of connections of the middle components 220B of the middle section 250B, which can in turn be greater than an average and/or total number of connections of the front components 220C of the front section 250C. By providing relatively smaller average and/or total number of connections in the front section(s), fewer articulation points are provided, resulting in greater overall stiffness and a smaller range of vertical deflection.

Figure 5:
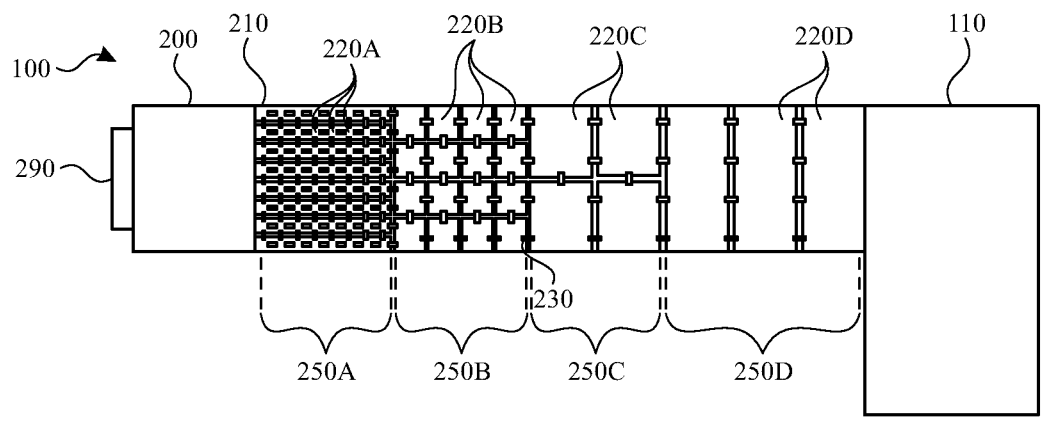
FIG. 5 illustrates a side view of a head-mountable device, according to some embodiments of the present disclosure.

Referring now to FIG. 5, a head securement element of a head-mountable device can include multiple components having different arrangements of articulation directions. As shown in FIG. 5, the head securement element 200 can include a rear section 250A (e.g., a first section) with rear components 220A, middle sections 250B and 250C (e.g., second and third sections) with middle components 220B and 220C, and a front section 250D (e.g., a fourth section) with front components 220D. The components can be connected by tethers 230 that provide articulation directions according to the direction of the tether extending across opposing surfaces of connected components.

As further shown in FIG. 5, each component can be directly connected by the tethers 230 to one or more other components positioned in one or more of a variety of directions. The rear components 220A of the rear section 250A can be provided in greater numbers than other sections divided into vertical columns and horizontal rows. It will be understood that other arrangements and articulation directions can be provided, such as connections from each component to six other components forming a honeycomb arrangements. Accordingly, the number of adjacent components for each given component can be relatively large in the rear section(s), with a correspondingly high number of articular directions for each given component. In the front section 250D, connections can be made in only one direction (e.g., parallel to a horizontal axis) to limit the number of articulating connections and directions of articulation. By providing relatively fewer and fewer types of connections in the front section(s), fewer articulation points and range of motion are provided, resulting in greater overall stiffness and a smaller range of vertical deflection.

As further shown in FIG. 5, each component can have a height-to-length ratio that impacts the range of vertical deflection. For example, the rear components 220A of the rear section 250A can each have a smaller height-to-length ratio than the front components 220D of the front section 250D. As such, the greater relative height of the front components 220D, compared to their lengths, provide a smaller range of vertical deflection.

Figure 6:
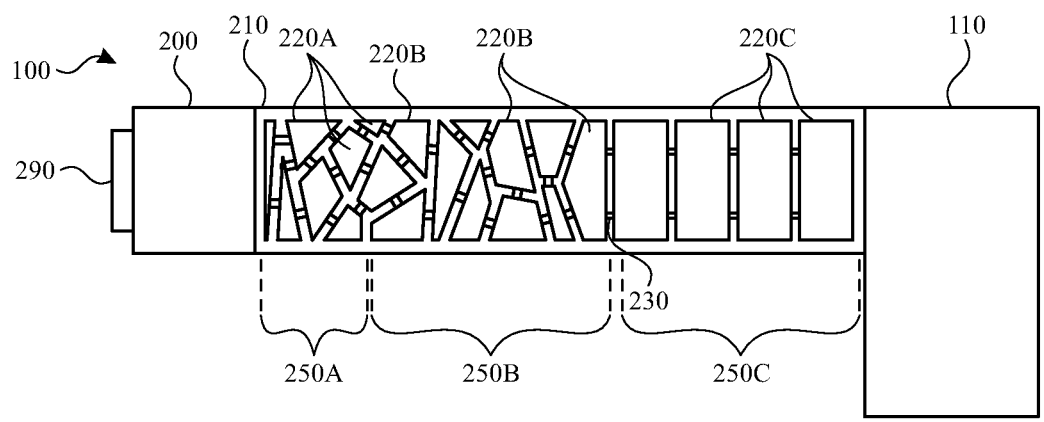
FIG. 6 illustrates a side view of a head-mountable device, according to some embodiments of the present disclosure.
Figure 7:
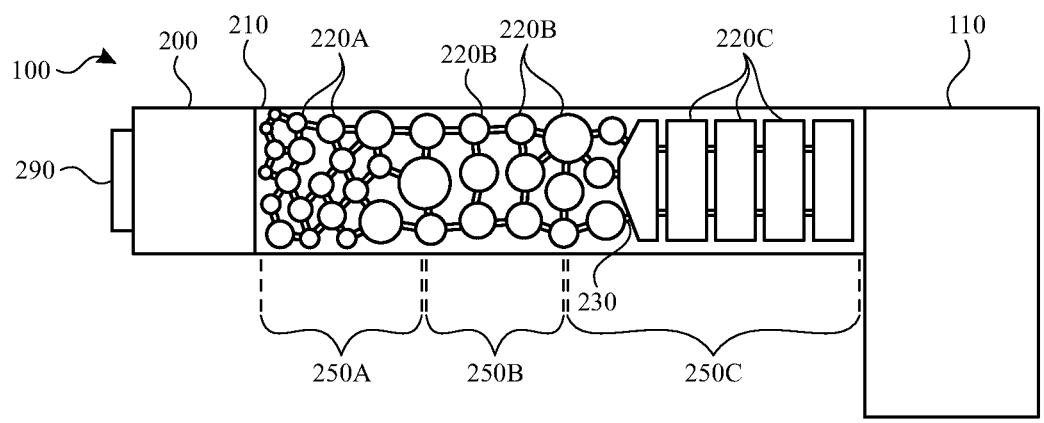
FIG. 7 illustrates a side view of a head-mountable device, according to some embodiments of the present disclosure.

Referring now to FIGS. 6 and 7, a head securement element of a head-mountable device can include multiple components having different shapes and arrangements of articulation directions. As shown in FIGS. 6 and 7, the head securement element 200 can include a rear section 250A (e.g., a first section) with rear components 220A, middle sections 250B and 250C (e.g., second and third sections) with middle components 220B and 220C, and a front section 250D (e.g., a fourth section) with front components 220D. The components can be connected by tethers 230 that provide articulation directions according to the direction of the tether extending across opposing surfaces of connected components. The components of one section can be different than at least one other shape of a component in a different section.

As shown in FIGS. 6 and 7, each of the components can have a shape, size, number of connections, and/or direction of connections that is different than that of at least one other component of another section. By providing the components of the front section(s) with relatively larger size, fewer connections, fewer connection directions, and higher density of components, the front section(s) have greater overall stiffness and a smaller range of vertical deflection.

Figure 8:
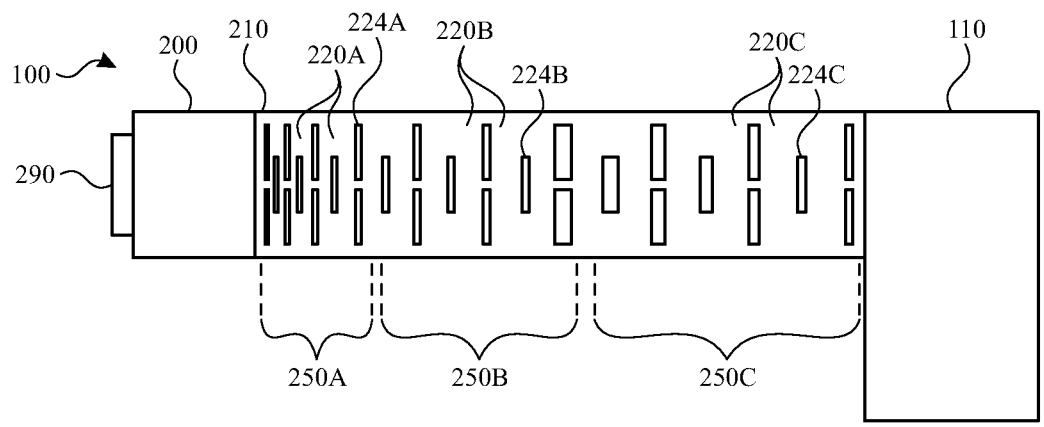
FIG. 8 illustrates a side view of a head-mountable device, according to some embodiments of the present disclosure.

Referring now to FIG. 8, a head securement element of a head-mountable device can include an arrangement forming a living hinge. As shown in FIG. 8, the head securement element 200 can include a rear section 250A (e.g., a first section) with rear components 220A separated by rear gaps 224A, a middle section 250B (e.g., a second section) with middle components 220B separated by middle gaps 224B, and a front section 250C (e.g., a third section) with front components 220C separated by front gaps 224C. The components can be monolitically formed while still being separated by the gaps, thereby providing regions of greater bendability to form articulation points.

As further shown in FIG. 8, the components can have different lengths, be provided in different numbers per length or area (e.g., density), and be separated by different size gaps. For example, each of the rear components 220A of the rear section 250A can have a length that is shorter than a length of each of the middle components 220B of the middle section 250B, which can in turn be shorter than a length of each of the front components 220C of the front section 250C. By further example, adjacent pairs of the rear components 220A of the rear section 250A can be separated a gap length that is longer than a gap length separating each of the middle components 220B of the middle section 250B, which can in turn be longer than a gap length separating each of the front components 220C of the front section 250C. Additionally or alternatively, the density (i.e., number and/or size per unit length and/or area) of gaps in the rear section(s) can be relatively high compared to the front section(s), and/or the density (i.e., number and/or size per unit length and/or area) of components in the rear section(s) can be relatively low compared to the front section(s). By providing relatively greater lengths and/or density of components and/or shorter lengths and/or lower density of gaps in the front section(s), a smaller range of vertical deflection is achieved.

Figure 9:
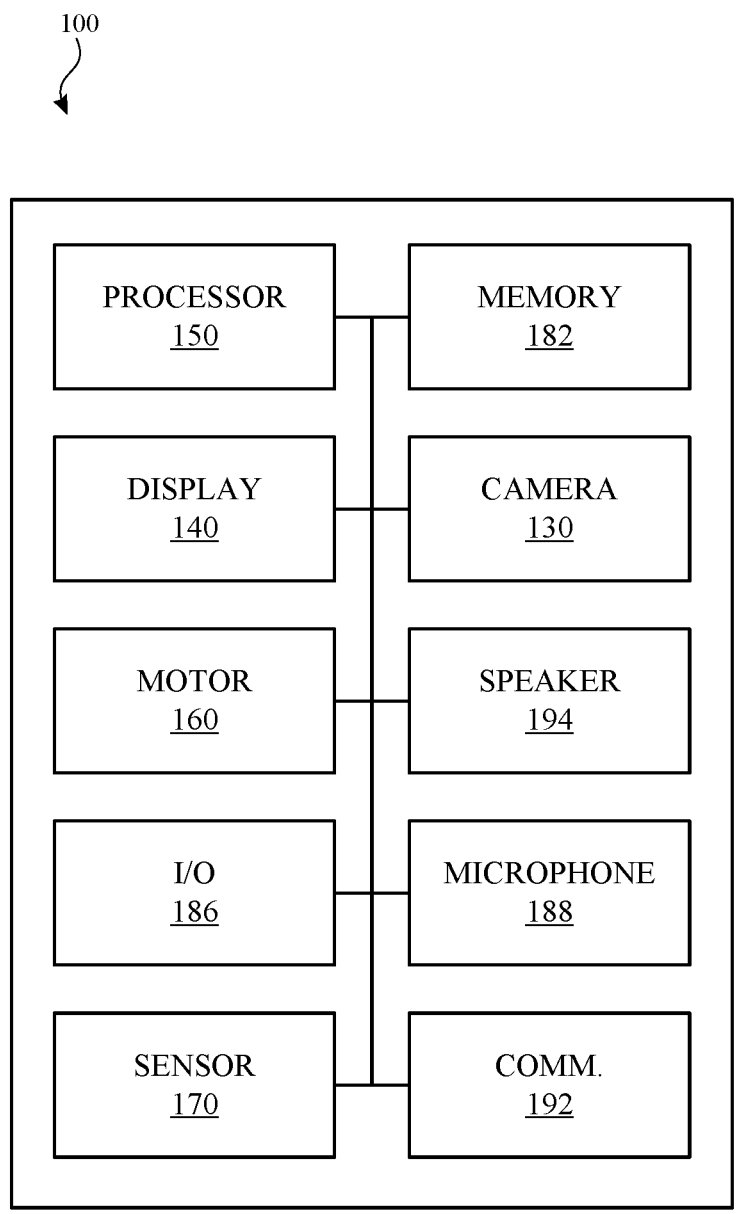
FIG. 9 illustrates a block diagram of a head-mountable device, in accordance with some embodiments of the present disclosure.

Referring now to FIG. 9, components of the head-mountable device can be operably connected to provide the performance described herein. FIG. 9 shows a simplified block diagram of an illustrative head-mountable device 100 in accordance with one embodiment of the invention. It will be appreciated that components described herein can be provided on one, some, or all of an HMD module and/or a head securement element. It will be understood that additional components, different components, or fewer components than those illustrated may be utilized within the scope of the subject disclosure.

As shown in FIG. 9, the head-mountable device 100 can include a processor 150 (e.g., control circuity) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display element 140 for close up viewing. The optical subassembly can include one or more lenses, mirrors, or other optical devices.

The head-mountable device 100 can include adjustment control components, such as a motor 160, an actuator, and the like for moving components to a desired relative position, orientation, and/or configuration as described herein.

The head-mountable device 100 can include one or more sensors 170, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include the speakers 194 as described herein. The speakers 194 can be operably connected to the processor 150 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery or other power source, which can charge and/or power components of the head-mountable device 100. The battery can also charge and/or power components connected to the head-mountable device 100.

Accordingly, embodiments of the present disclosure provide a head-mountable device can include a head securement element that provides limited flexibility while also providing adequate stiffness to reduce the effects of sagging components under their own weight. Such stiffness can help the forces be distributed evenly across the face. For example, rather than allowing excessive forces to weigh on the cheeks and/or nose of the user, certain types of stiffness about the head-mountable device can help distribute forces along the forehead of the user and/or other regions.

Various examples of aspects of the disclosure are described below as clauses for convenience. These are provided as examples, and do not limit the subject technology.

Clause A: a head-mountable device comprising: a frame; a display element supported by the frame; and a head securement element having ends coupled to the frame, the head securement element comprising: a rear section comprising interconnected rear components distributed along a length of the rear section; and a front section between the rear section and the frame, the front section comprising interconnected front components distributed along a length of the front section, wherein the front components are larger than the rear components.

Clause B: a head-mountable device comprising: a frame; a display element supported by the frame; and a head securement element comprising: a first section comprising first components that are configured to pivot relative to each other to provide the first section with a first range of vertical deflection; and a second section between the first section and the frame, the second section comprising second components that are configured to pivot relative to each other to provide the second section with a second range of vertical deflection that is less than the first range of vertical deflection.

Clause C: a head-mountable device comprising: a frame; a display element supported by the frame; and a head securement element having ends coupled to the frame, the head securement element comprising: a rear section comprising rear components distributed along a length of the rear section; and a front section between the rear section and the frame, the front section comprising front components distributed along a length of the front section; a tether extending through each of the rear components and each of the front components.

One or more of the above clauses can include one or more of the features described below. It is noted that any of the following clauses may be combined in any combination with each other, and placed into a respective independent clause, e.g., clause A, B, or C.

Clause 1: a camera configured to capture an image for output on the display element; a speaker; a microphone; and a sensor.

Clause 2: the head securement element further comprises a middle section between the front section and the rear section, the middle section comprising interconnected middle components distributed along a length of the middle section, the middle components being larger than the rear component and smaller than the front components.

Clause 3: a density of the front components in the front section is greater than a density of the rear components in the rear section.

Clause 4: adjacent pairs of the front components are separated by a first distance; and adjacent pairs of the front components are separated by a second distance that is greater than the first distance.

Clause 5: a height-to-length ratio of the front components in the front section is greater than a height-to-length of the rear components in the rear section.

Clause 6: a shape of the front components is different than a shape of the rear components.

Clause 7: the head securement element further comprises a flexible band sheath encasing the front components and the rear components.

Clause 8: an adjustment element configured to change a tightness of the head securement element by controlling an effective length of the head securement element between ends extending from the frame.

Clause 9: the first components are configured to pivot relative to each other to provide the first section with a first range of horizontal deflection that is greater than the first range of vertical deflection; and the second components are configured to pivot relative to each other to provide the second section with a second range of horizontal deflection that is greater than the first range of vertical deflection.

Clause 10: the first components and the second components are monolithically formed.

Clause 11: the head securement element further comprises a flexible band sheath encasing the first components and the second components.

Clause 12: a number of rear components within a first length of the front section is greater than a number of front components within a second length, equal to the first length, of the front section.

Clause 13: an adjustment element configured to control a distance between the front components and the rear components by changing an effective length of the tether.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a frame;
a display element supported by the frame; and
a head securement element having ends coupled to the frame, the head securement element comprising:
a rear section comprising interconnected rear components distributed along a length of the rear section;
a front section between the rear section and the frame, the front section comprising interconnected front components distributed along a length of the front section, wherein the front components are larger than the rear components; and
a middle section between the front section and the rear section, the middle section comprising interconnected middle components distributed along a length of the middle section, the middle components being larger than the rear component and smaller than the front components.

2. The head-mountable device of claim 1, further comprising:
a camera configured to capture an image for output on the display element;
a speaker;
a microphone; and
a sensor.

3. A head-mountable device comprising,
a frame;
a display element supported by the frame; and
a head securement element having ends coupled to the frame, the head securement element comprising:
a rear section comprising interconnected rear components distributed along a length of the rear section; and
a front section between the rear section and the frame, the front section comprising interconnected front components distributed along a length of the front section, wherein the front components are larger than the rear components, wherein a density of the front components in the front section is greater than a density of the rear components in the rear section.

4. The head-mountable device of claim 1, wherein:
adjacent pairs of the front components are separated by a first distance; and
adjacent pairs of the front components are separated by a second distance that is greater than the first distance.

5. The head-mountable device of claim 1, wherein a height-to-length ratio of the front components in the front section is greater than a height-to-length of the rear components in the rear section.

6. The head-mountable device of claim 1, wherein a shape of the front components is different than a shape of the rear components.

7. The head-mountable device of claim 1, wherein the head securement element further comprises a flexible band sheath encasing the front components and the rear components.

8. The head-mountable device of claim 1, further comprising an adjustment element configured to change a tightness of the head securement element by controlling an effective length of the head securement element between ends extending from the frame.

9. A head-mountable device comprising:
a frame;
a display element supported by the frame; and
a head securement element comprising:
a first section comprising first components that are configured to pivot relative to each other to provide the first section with a first range of vertical deflection; and
a second section between the first section and the frame, the second section comprising second components that are configured to pivot relative to each other to provide the second section with a second range of vertical deflection that is less than the first range of vertical deflection.

10. The head-mountable device of claim 9, wherein:
the first components are configured to pivot relative to each other to provide the first section with a first range of horizontal deflection that is greater than the first range of vertical deflection; and
the second components are configured to pivot relative to each other to provide the second section with a second range of horizontal deflection that is greater than the first range of vertical deflection.

11. The head-mountable device of claim 9, wherein the first components and the second components are monolithically formed.

12. The head-mountable device of claim 9, wherein the head securement element further comprises a flexible band sheath encasing the first components and the second components.

13. The head-mountable device of claim 9, further comprising an adjustment element configured to change a tightness of the head securement element by controlling an effective length of the head securement element between ends extending from the frame.

14. A head-mountable device comprising:
a frame;
a display element supported by the frame; and
a head securement element having ends coupled to the frame, the head securement element comprising:
a rear section comprising rear components distributed along a length of the rear section;
a front section between the rear section and the frame, the front section comprising front components distributed along a length of the front section;
a tether extending through each of the rear components and each of the front components; and
an adjustment element configured to control a distance between the front components and the rear components by changing an effective length of the tether.

15. The head-mountable device of claim 14, wherein a height-to-length ratio of the front components in the front section is greater than a height-to-length of the rear components in the rear section.

16. The head-mountable device of claim 14, wherein a number of rear components within a first length of the front section is greater than a number of front components within a second length, equal to the first length, of the front section.

17. The head-mountable device of claim 14, wherein the head securement element further comprises a flexible band sheath encasing the front components and the rear components.

18. The head-mountable device of claim 14, further comprising an adjustment element configured to change a tightness of the head securement element by controlling an effective length of the head securement element between ends extending from the frame.

19. The head-mountable device of claim 1, wherein the front components have a length that is greater than a length of the rear components.

20. The head-mountable device of claim 3, wherein the front components have a length that is greater than a length of the rear components.

\* \* \* \* \*